United States Patent
Yabe

[11] Patent Number: 5,706,362
[45] Date of Patent: Jan. 6, 1998

[54] IMAGE TRACKING APPARATUS

[75] Inventor: Sanae Yabe, Himeji, Japan

[73] Assignee: Mitsubishi Denki Kabushiki Kaisha, Tokyo, Japan

[21] Appl. No.: 729,423

[22] Filed: Oct. 11, 1996

Related U.S. Application Data

[63] Continuation of Ser. No. 216,721, Mar. 23, 1994, abandoned.

Foreign Application Priority Data

Mar. 31, 1993 [JP] Japan .................. 5-073945

[51] Int. Cl.$^6$ .................. G06K 9/00; G06K 9/40
[52] U.S. Cl. .................. 382/103; 382/254; 382/275; 348/149; 348/170
[58] Field of Search .................. 382/100, 103, 382/209, 218, 254, 274, 275, 278; 348/129, 130, 169, 170, 148, 149, 152, 153, 154, 701

[56] References Cited

U.S. PATENT DOCUMENTS

| | | | |
|---|---|---|---|
| 4,661,853 | 4/1987 | Roeder et al. | 358/167 |
| 5,023,712 | 6/1991 | Kajiwara | 358/105 |
| 5,151,945 | 9/1992 | Lee et al. | 382/103 |
| 5,208,874 | 5/1993 | Omura | 382/54 |
| 5,243,418 | 9/1993 | Kuno et al. | 348/170 |
| 5,276,519 | 1/1994 | Richards et al. | 382/275 |
| 5,280,530 | 1/1994 | Trew et al. | 382/103 |

FOREIGN PATENT DOCUMENTS

0495508  1/1992  European Pat. Off. .......... G06F 15/66

*Primary Examiner*—Leo Boudreau
*Assistant Examiner*—Bipin Shalwala
*Attorney, Agent, or Firm*—Sughrue,Mion,Zinn,Macpeak & Seas, PLLC

[57] ABSTRACT

An image tracking apparatus includes a video camera 10 for forming an image of a target vehicle and for producing image signals at predetermined time intervals, a first memory 5A for storing image signals, a window setting switch 9 for setting a tracking window on the image signals which were stored in the first memory, a second memory 6A for storing, as reference image signals, the image signals on which the tracking window has been set, a device 11 for detecting whether or not any disturbance has been introduced into the image signals stored in the first memory, and a device 12 for correcting by interpolation the image signals stored in the first memory to reduce the influence of any disturbances. A window updating device updates the tracking window in accordance with a comparison between the reference image signals stored in the second memory and the image signals stored in the first memory, or, when a disturbance has been introduced, in accordance with a comparison between the reference image signals stored in the second memory and the corrected image signals.

8 Claims, 7 Drawing Sheets

| $A_{i,j}$ | $A_{i+1,j}$ | $A_{i+2,j}$ | $A_{i+3,j}$ |
|---|---|---|---|
| $B_{i,j}$ | $B_{i+1,j}$ | $B_{i+2,j}$ | $B_{i+3,j}$ |
| $A_{i,j+1}$ | $A_{i+1,j+1}$ | $A_{i+2,j+1}$ | $A_{i+3,j+1}$ |
| $B_{i,j+1}$ | $B_{i+1,j+1}$ | $B_{i+2,j+1}$ | $B_{i+3,j+1}$ |
| $A_{i,j+2}$ | $A_{i+1,j+2}$ | $A_{i+2,j+2}$ | $A_{i+3,j+2}$ |
| $B_{i,j+2}$ | $B_{i+1,j+2}$ | $B_{i+2,j+2}$ | $B_{i+3,j+2}$ |

FIG. 8

| $C_{i,j}$ | $C_{i+1,j}$ | $C_{i+2,j}$ | $C_{i+3,j}$ |
|---|---|---|---|
| $D_{i,j}$ | $D_{i+1,j}$ | $D_{i+2,j}$ | $D_{i+3,j}$ |
| $C_{i,j+1}$ | $C_{i+1,j+1}$ | $C_{i+2,j+1}$ | $C_{i+3,j+1}$ |
| $D_{i,j+1}$ | $D_{i+1,j+1}$ | $D_{i+2,j+1}$ | $D_{i+3,j+1}$ |
| $C_{i,j+2}$ | $C_{i+1,j+2}$ | $C_{i+2,j+2}$ | $C_{i+3,j+2}$ |
| $D_{i,j+2}$ | $D_{i+1,j+2}$ | $D_{i+2,j+2}$ | $D_{i+3,j+2}$ |

IMAGE TRACKING APPARATUS

This is a Continuation of application Ser. No. 08/216,721 now abandoned filed Mar. 23, 1994.

BACKGROUND OF THE INVENTION

1. Field of the Invention

The present invention relates to an image tracking apparatus which is mounted, for example, on a vehicle such as an automobile. More particularly, the invention is concerned with an image tracking apparatus using a video camera and capable of preventing any deviation of a tracking window.

2. Description of the Related Art

Figure 10:
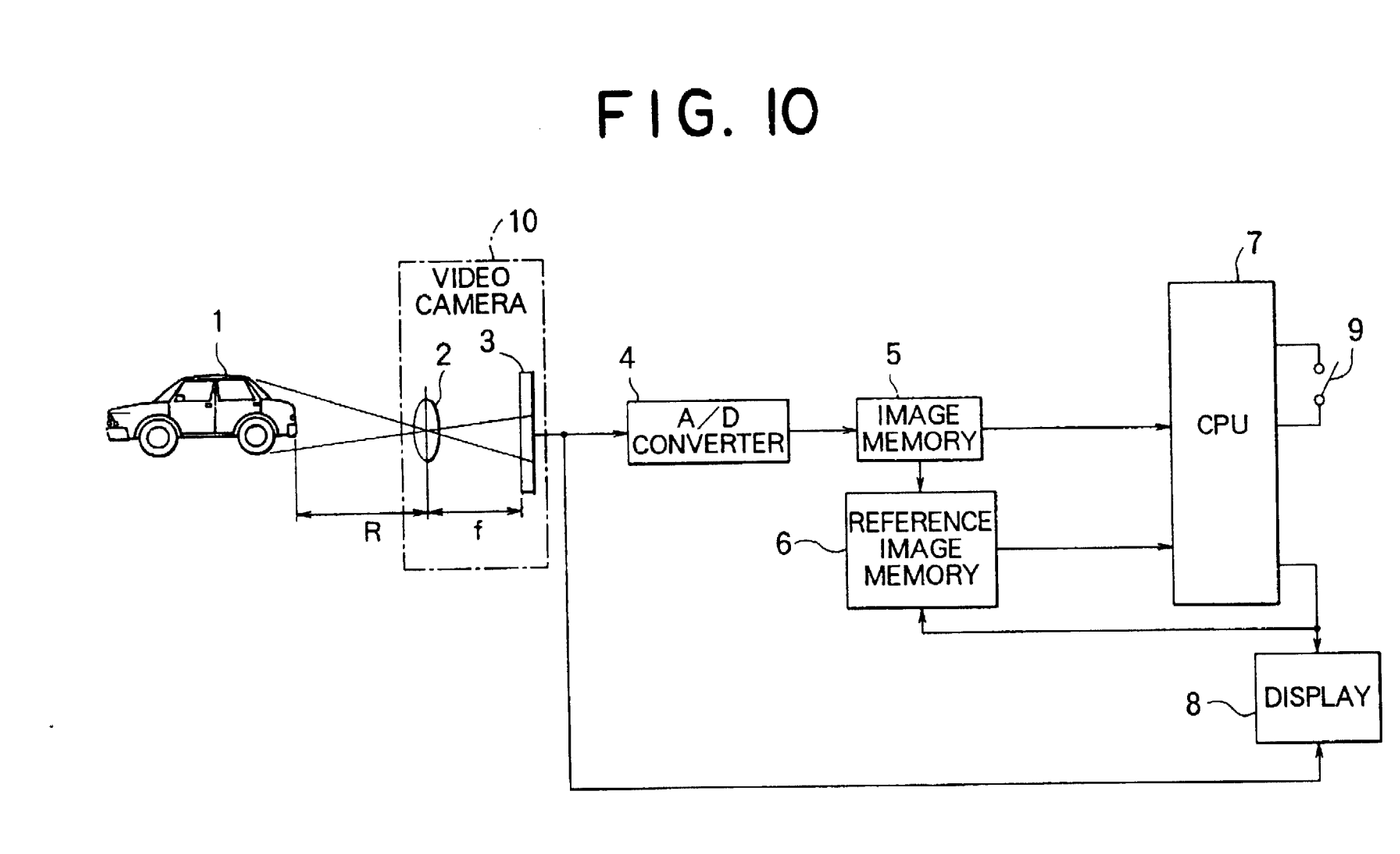
FIG. 10 is a block diagram of a known image tracking apparatus.

An image tracking apparatus has been known which incorporates an image sensor of the type used in video cameras, as disclosed for example in Japanese patent Laid-Open No. 3-197805. FIG. 10 shows, in block diagram, an example of such a known apparatus. Referring to this Figure, a target vehicle to be tracked is denoted by numeral 1. The image chased apparatus includes a lens 2, an image sensor 3 which is disposed behind the lens 2 at a focal distance f from the lens 2, an A/D converter 4 connected to the image sensor 3, an image memory 5 connected to the A/D converter 4, a reference image memory 6 connected to the memory 5, a computer (CPU) 7 connected to the memories 5, 6, an image display 8 connected to the CPU 7 and also to the image sensor 3, and a switch 9 connected to the CPU 7 and serving as a tracking window setting means.

In the known tracking apparatus having the described construction, the lens 2 and the image sensor 3 form an optical system of a video camera 10. An image of the target vehicle 1, which is at a distance R from the front face of the lens 2, is formed on the image sensor 3 through a lens 2. The image signal produced by the image sensor 3 is converted into digital signals through the A/D converter 4, and the thus formed digital signals are stored in the memory 5. The tracking window is set by the driver through the switch 9 so that the target vehicle 1 is suitably contained in the area of the window.

In operation, first image signals are stored in the image memory 5 at a moment t0. Then, second image signals are formed by setting a tracking window on the first image signals. The second image signals thus formed are stored in a reference image memory 6. Signals within the tracking window in the second image signals are used as reference image signals. At a next moment t1, the first image formed by the first image signals is updated in the image memory 5 and a new window is set by searching an image which is best correlated with the reference image signals, whereby the tracking window is automatically updated.

This known image tracking apparatus, however, suffers from a problem in that the image contrast may be impaired due to the introduction of electrical noises produced by a wiper system or due to vibration of the vehicle chassis, with the result that the correlation to the reference image is changed or lost, tending to cause a deviation of the tracking window. Consequently, the driver is obliged to frequently reset the window by watching, while driving, the image of the target vehicle 1 on the display 8, thus hampering safety of driving.

SUMMARY OF THE INVENTION

Accordingly, an object of the present invention is to provide an image tracking apparatus in which, once the target vehicle is set, the target vehicle is tracked without deviation of the window, thus contributing to safety in the driving.

To this end, according to one aspect of the present invention, there is provided an image tracking apparatus, comprising: imaging means for forming an image of a target to be tracked and for producing image signals based on the formed image at a predetermine time interval; a first memory for storing image signals produced by the imaging means; window setting means for setting a tracking window on the image signals which were stored in the first memory a predetermined time before; a second memory for storing, as reference image signals, the image signals on which the tracking window has been set by the window setting means; disturbance detecting means for detecting whether or not any disturbance has been introduced into the image signals stored in the first memory; correcting means for correcting, when the disturbance detecting means has detected that the disturbance has been introduced, the image signals stored in the first memory in such a manner as to reduce the influence of the disturbance; and window updating means which updates the tracking window in accordance with the result of comparison between the reference image signals stored in the second memory and the image signals stored in the first memory when the disturbance detecting means has detected that no disturbance has been introduced, whereas, when the disturbance detecting means has detected that a disturbance has been introduced, updates the tracking window in accordance with the result of comparison between the reference image signals stored in the second memory and the image signals which have been corrected by the correcting means.

According to another aspect of the present invention, there is provided an image tracking apparatus, comprising: imaging means for forming an image of a target to be tracked and for producing image signals based on the formed image at a predetermine time interval; a first memory for storing image signals produced by the imaging means; window setting means for setting a tracking window on the image signals which were stored in the first memory a predetermined time before; a second memory for storing, as reference image signals, the image signals on which the tracking window has been set by the window setting means; window updating means for updating the window in accordance with the result of comparison between the reference image signals stored in the second memory and the image signals stored in the first memory; disturbance detecting means for detecting whether or not a disturbance has been introduced in the image signals stored in the first memory; and update prohibiting means for prohibiting the updating of the window to be performed by the window updating means when introduction of disturbance has been detected by the disturbance detecting means.

DESCRIPTION OF THE PREFERRED EMBODIMENTS

A description will now be given of embodiments of the present invention, with specific reference to the accompanying drawings.

First Embodiment

Figure 1:
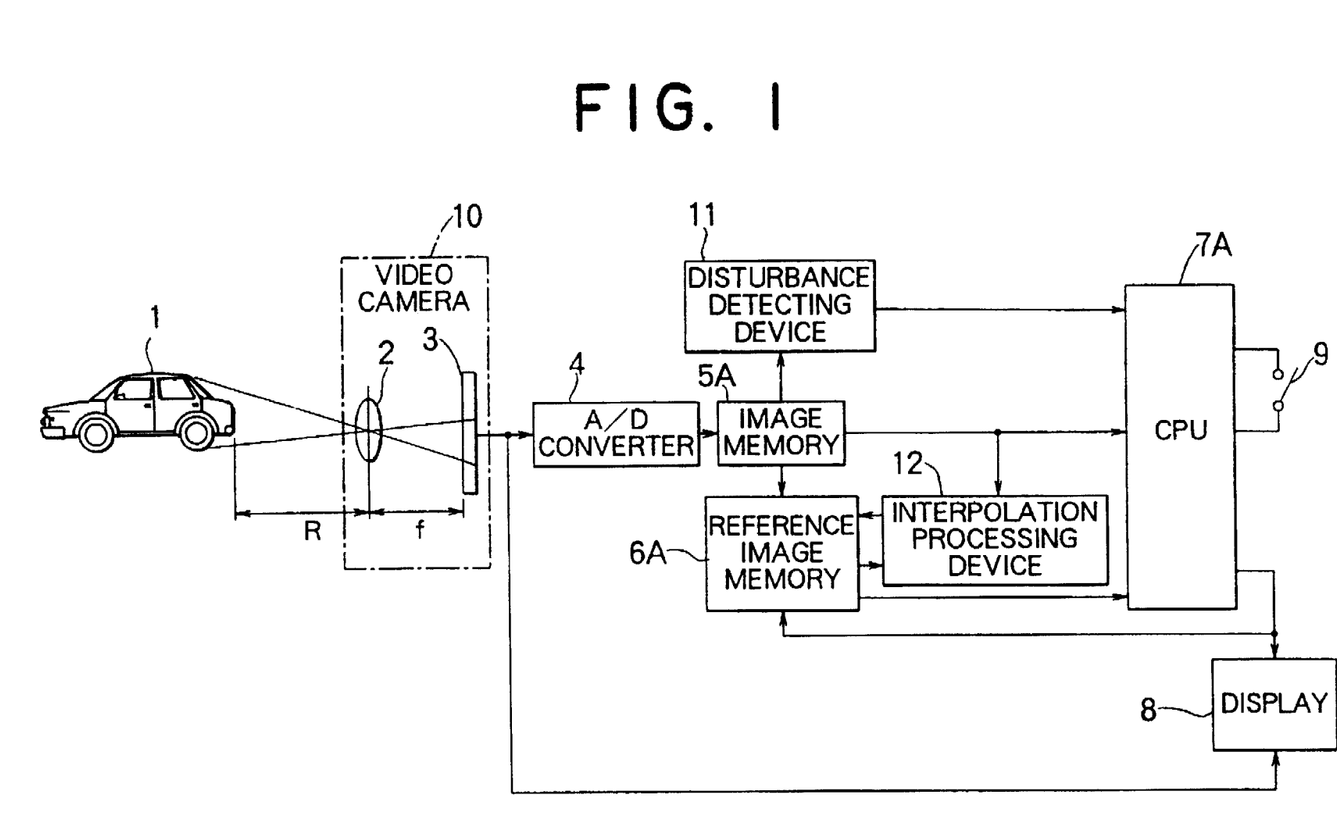
FIG. 1 is a block diagram of an embodiment of the image tracking apparatus in accordance with the present invention.

Referring to FIG. 1, a first embodiment of the image tracking apparatus of the present invention is mounted, for example, a vehicle such as an automobile. The apparatus has a video camera 10 and an A/D converter 4 connected to the video camera. The A/D converter 4 is connected to an image memory 5A to which are connected a reference image memory 6A, a CPU 7A, a disturbance detecting device 11 and an interpolation processing device 12. The reference image memory 6A is connected both to the CPU 7A and the interpolation processing device 12. The disturbance detecting device 11 is connected to the CPU 7A. A display 8 is connected to the video camera 10 and the CPU 7A. Numeral 9 denotes a switch which is connected to the CPU 7A and which serves as a tracking window setting means. The video cameral 10 has a lens 2 and an image sensor 3.

A description will now be given of the image tracking process performed by the first embodiment, with reference to a flow chart shown in FIG. 9. In Step S30, image signals are picked up at a predetermined time interval by means of the video camera 10. More specifically, the image of a target vehicle 1 which is ahead of the lens 2 at a distance R therefrom is formed on the image sensor 3 which is disposed behind the lens 2 at the focal distance f of the lens 2, whereby image signals are output from the image sensor 3. The image signals, which are in analog form, are converted into digital signals through the A/D converter 4, and the thus-obtained digital signals are stored in the image memory 5A. The stored image signals are then transferred after elapse of a predetermined time to the reference image memory 6A so as to be stored in the latter.

Figure 2:
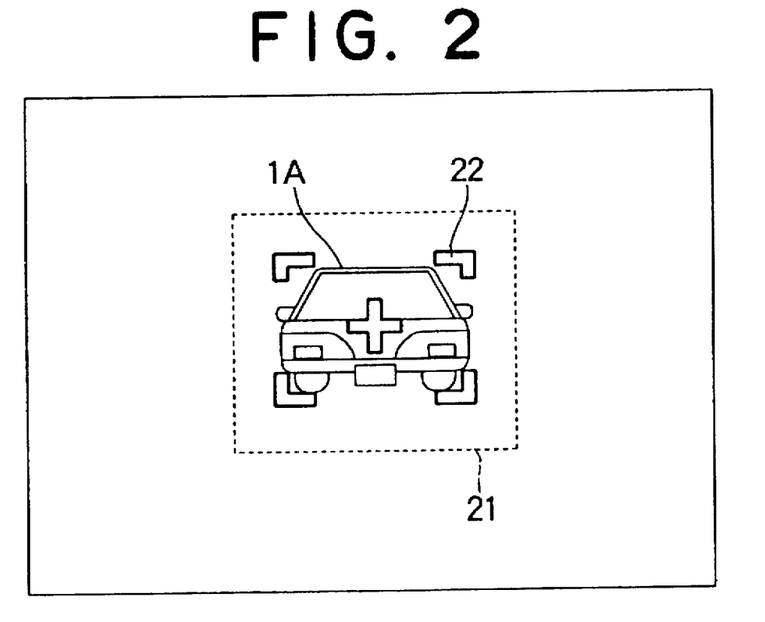
FIG. 2 is an illustration of an image in a set window.

The driver of the vehicle mounting the first embodiment of the image tracking apparatus operates a switch 9 connected to the CPU 7A, while monitoring the image on the display 8, thereby selecting the image of the target vehicle 1 to be tracked. In response to the operation of the switch 9, the CPU 7A functions to set a tracking window on the image signals which are stored in the reference image memory 6A. The selected image with a window 22 set thereon is shown in FIG. 2. Referring to FIG. 2, numeral 1A designates the image of the target vehicle, while 21 indicates the search coverage area over which the image signals are compared later. The tracking window 22 is included within the search coverage area 21.

Figure 3:
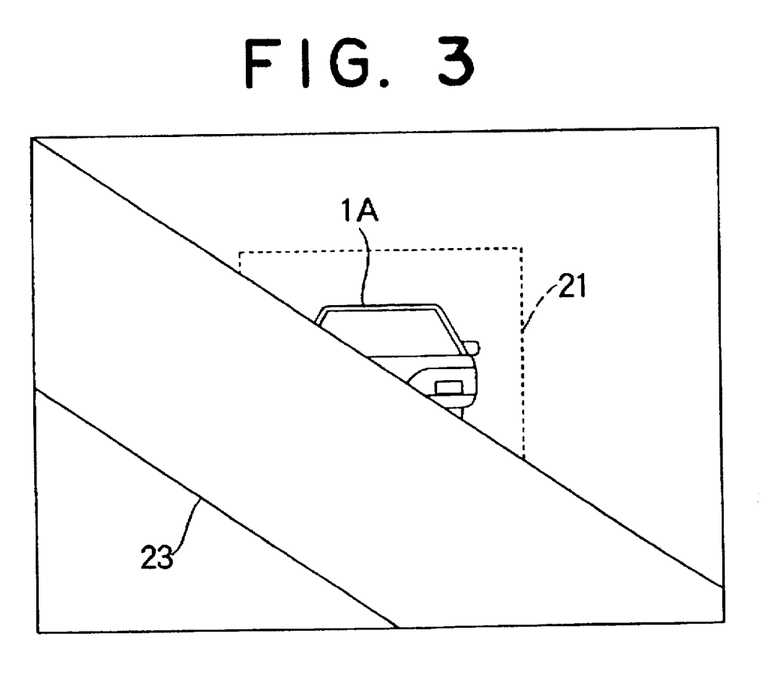
FIG. 3 is an illustration of the most-currently input image disturbed by a disturbance.

FIG. 3 shows the most current image which has been newly picked up and stored in the image memory 5A. Part of the image is hidden by a wiper band 23 which is produced as a result of introduction of a disturbance.

Figure 4:
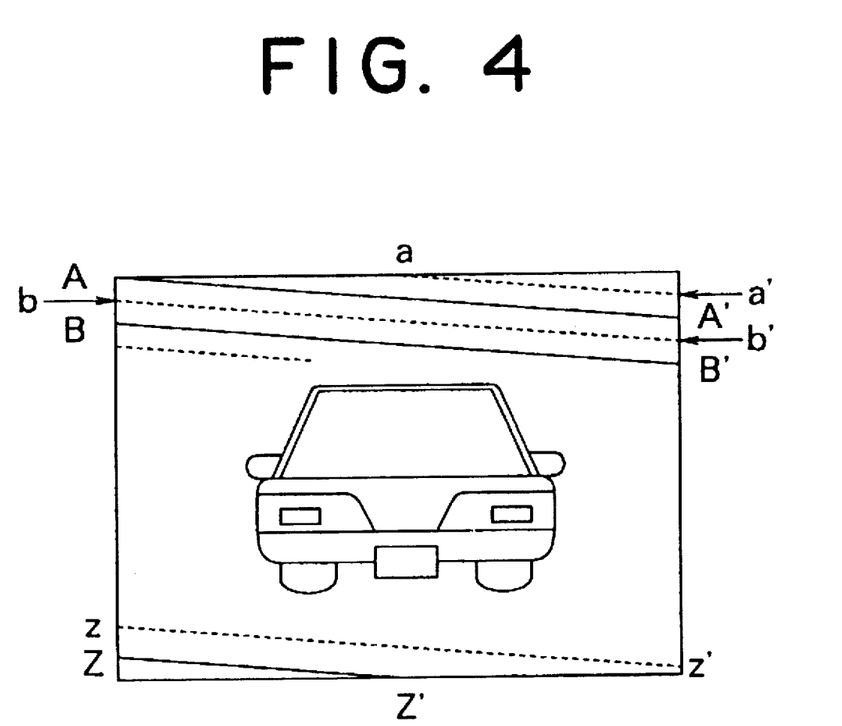
FIG. 4 is an illustration of one frame of displayed image.

A description will now be given of the image which is picked up by the video camera 10, with specific reference to FIG. 4. A scanning is commenced at a point A on the left upper corner of the display frame along the scan line AA' till a point A' on the right upper corner of the display frame is reached. Then, the next cycle of scanning is commenced from a point B along a scanning line BB' which is parallel to the scanning line AA'. The scanning is cyclically repeated in the described manner along the successive scanning lines down to the scanning line ZZ'. Scanning is thus completed over a predetermined number of scanning lines, e.g., 262.5, and a first field of image frame is formed by the signals obtained through this scanning. Then, scanning is commenced again from a point "a" on the frame along a scanning line aa', and then along a scanning line bb', which is intermediate between the scanning lines AA' and BB' of the first field. The scanning is then cyclically conducted along successive scanning lines intermediate between the successive scanning lines of the first field, down to the scanning line zz', thus completing scanning over another 262.5 scanning lines. A second field of the image frame is formed by the image signals obtained through this scanning operation. Consequently, an image of one frame is formed by two interleaved fields, from the signals obtained through scanning along 525 scanning lines in total.

Figure 5A:
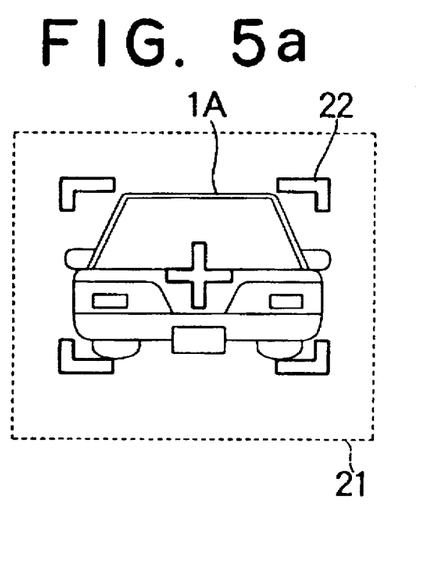
FIGS. 5a and 5b are illustrations of first and second fields within the search coverage area for the image shown in FIG. 2.
Figure 5B:
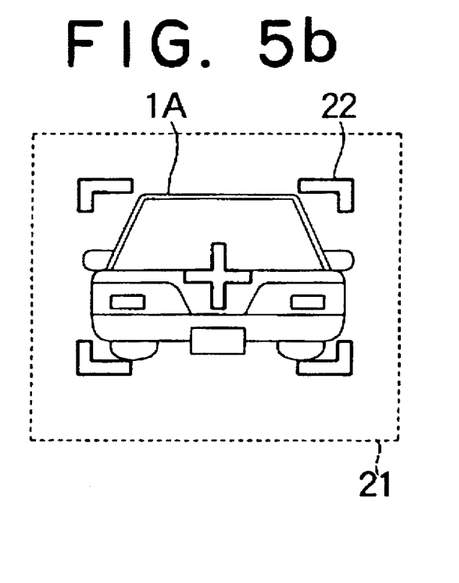

FIGS. 5a and 5b in combination show the image within the search coverage area 21 in one image frame shown in FIG. 2. More specifically, FIG. 5a shows the image of the first field, while FIG. 5b shows the image of the second field. As will be noted, they are identical.

Figure 6A:
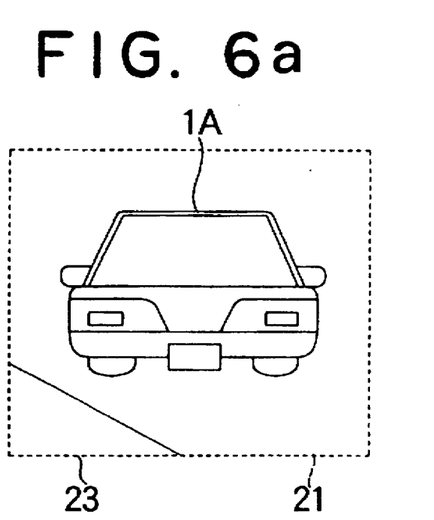
FIGS. 6a and 6b are illustrations of first and second fields within the search coverage area for the image shown in FIG. 3.
Figure 6B:
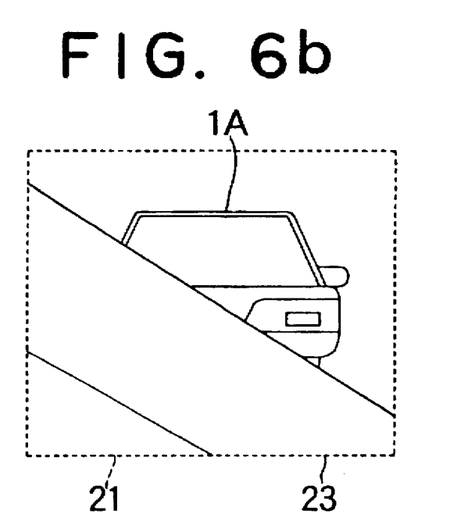

Similarly, FIGS. 6a and 6b in combination show the image within the search coverage area 21 in one image frame shown in FIG. 3. More specifically, FIG. 6a shows the image of the first field, while FIG. 6b shows the image of the second field.

Figure 7:
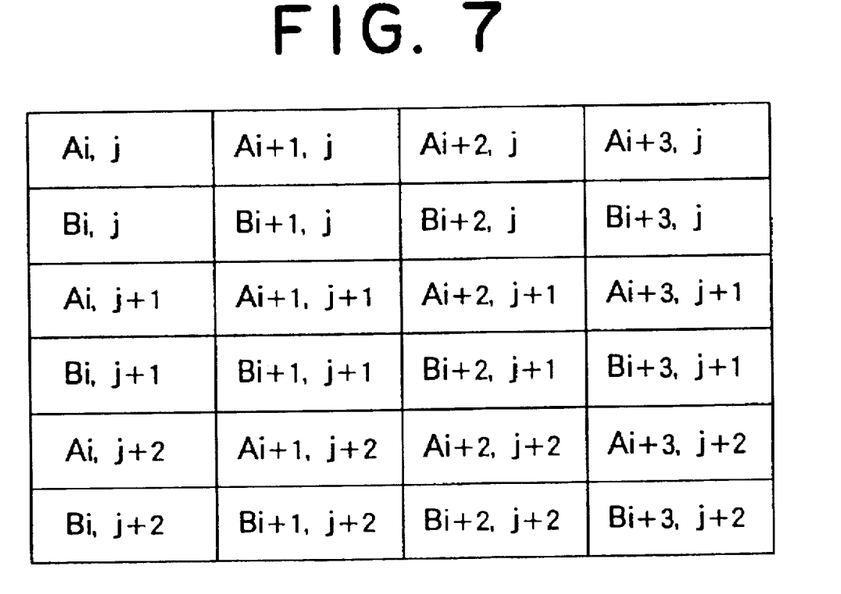
FIGS. 7 and 8 are pixel-based illustrations of the image signals within the search coverage areas for the images shown in FIGS. 2 and 3.

FIG. 7 shows, on pixel basis, the image within the search coverage area shown in FIG. 2. Symbol $A_{ij}$ shows the A/D converted value of each pixel in the first field, whereas $B_{ij}$ shows the A/D converted value of each pixel in the second field.

Figure 8:
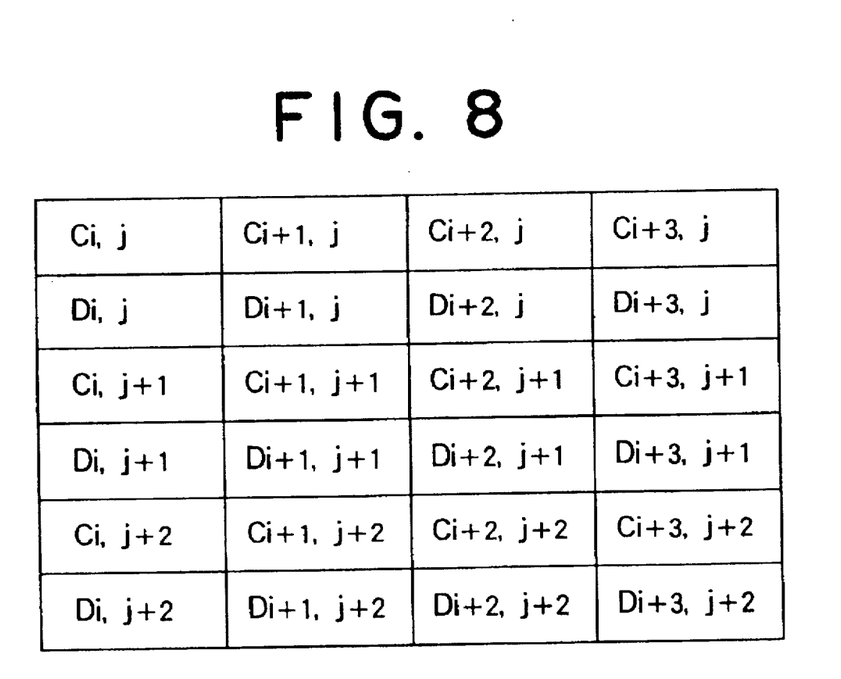

Similarly, FIG. 8 shows, on pixel basis, the image within the search coverage area shown in FIG. 3. Symbol $C_{ij}$ shows the A/D converted value of each pixel in the first field, whereas $D_{ij}$ shows the A/D converted value of each pixel in the second field.

Figure 9:
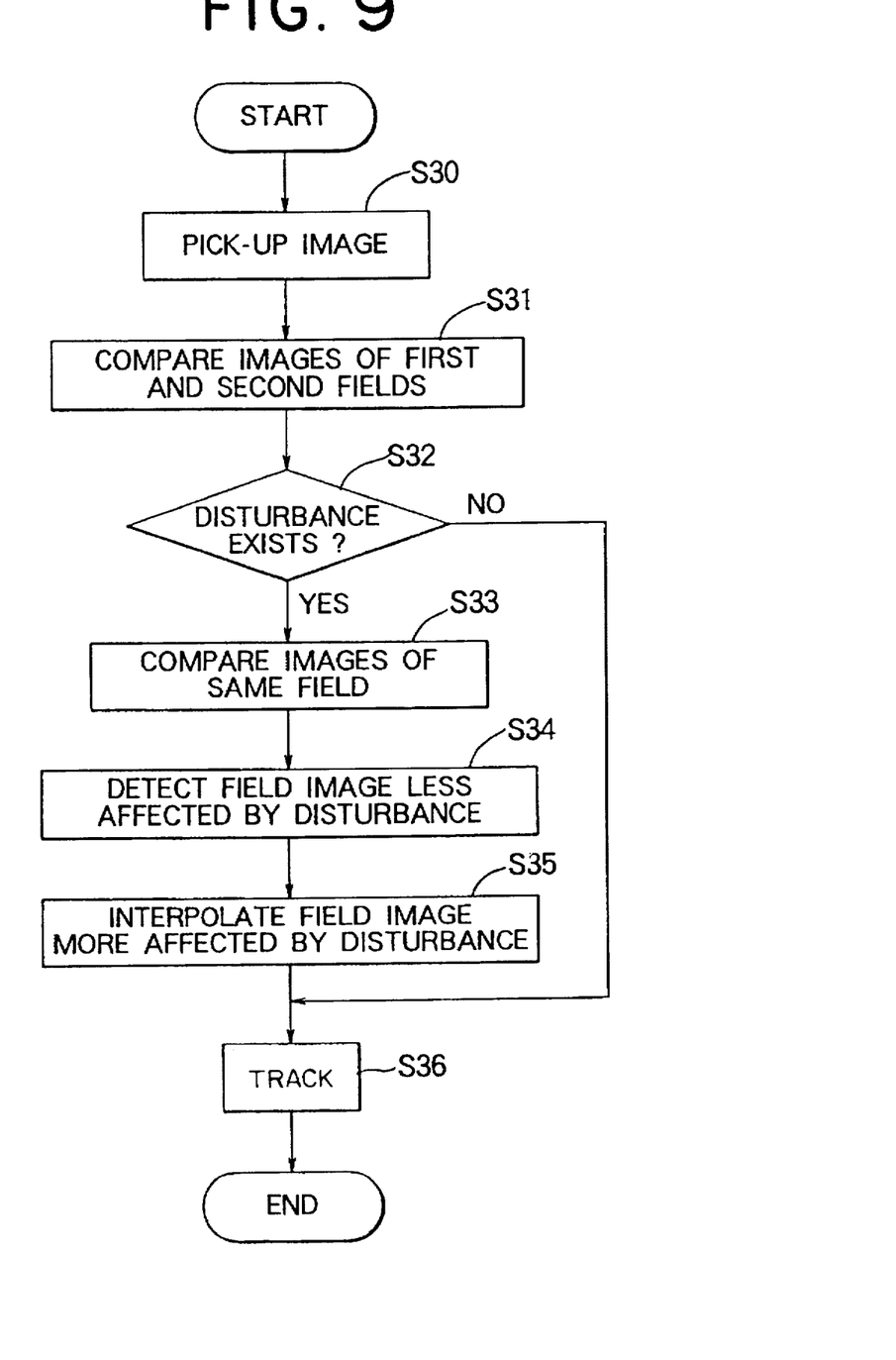
FIG. 9 is a flow chart illustrative of the operation of the first embodiment.

As stated above, an image is picked up in Step S30 of the flow chart shown in FIG. 9. When the image pick-up is finished, the process proceeds to Step S31 in which the disturbance detection device 11 conducts a comparison between the first field image and the second field image of the most-current image shown in FIGS. 6a and 6b, in order to determine whether or not any disturbance has been introduced into the search coverage area 21 of the image of the most-current image signals stored in the image memory 5A. More specifically, the comparison is executed by computing the sum E of the differences between the image signals within the search coverage area of the first field and those Within the search coverage area of the second field in accordance with the following formula, and the thus-determined sum E is used as the comparison value indicative of the correlation between the images of two fields.

$$E = \Sigma_i \Sigma_j |C_{i,j} - D_{i,j}| \tag{1}$$

In Step S32, the disturbance detecting device 11 determines whether or not there is any disturbance, on the basis of the computed comparison value E. More specifically, when the comparison value E is greater than a predetermined value E1, the disturbance detecting device 11 determines that there is no correlation between the image of the first field and the image of the second field, i.e., a disturbance exists. Conversely, when the result E of the comparison computation is not greater than 1, the disturbance detecting device determines that a correlation exists between the image of the first field and the image of the second field, i.e., there is no disturbance. When it has been determined in Step S32 that a disturbance has been introduced, the process proceeds to Step S33 in which the CPU 7A performs, using the image within the search coverage area obtained in the preceding image pick-up cycle shown in FIG. 2 as the reference image, a comparison computation for determining the comparison computation value F which is indicative of the correlation between the image of the first field of the reference image shown in FIG. 5a and the image of the first field shown in FIG. 6a which has been influenced by the disturbance. The comparison computation value F is the sum of the differences between the first field of the reference image and the first field of the image within the present search coverage area, and is determined in accordance with the following equation (2) using symbols shown in FIGS. 7 and 8.

$$F = \Sigma i \Sigma j |A i,j - C i,j| \qquad (2)$$

A similar comparison is executed between the second field of the reference image shown in FIG. 5b and the second field of the image affected by the disturbance shown in FIG. 6b, so as to determine the comparison computation value G in accordance with the following equation (3), using symbols shown in FIGS. 7 and 8.

$$G = \Sigma i \Sigma j |B i,j - D i,j| \qquad (3)$$

In general, the comparison computation value is smaller when the degree of correlation between the field images is higher. Therefore, in Step S34, the CPU 7A determines that the field images, which provide the smallest comparison computation value F or G, have suffered least from the influence of the disturbance.

In Step S35, the interpolation processing device 12 performs an interpolation processing in accordance with the instructions given by the CPU 7A, using the images of the field which has been determined in Step S34 as being less affected by the disturbance. For instance, when it has been determined that the image of the first field has been less affected by the disturbance than the image of the second field, image signals for the second field are generated by interpolation based upon the image signals of the first field. The interpolation may be conducted by replacing, on a pixel basis, the image signals of the second field with the image signals of the first field, as shown in the following equation (4). In another method of the interpolation, a computation is conducted to determine the average value between the first field image signals of each two adjacent pixels, and the thus determined average value is substituted for the second field image signal, as expressed by the following equation (5).

$$D i,j = C i,j \text{ or } C i+1,j \qquad (4)$$

$$D i,j = (C i,j + C i+1,j)/2 \qquad (5)$$

Then, in Step S36, the CPU 7A performs tracking of the target vehicle 1 with an updated window 22. Namely, when Step S32 has determined that there is a disturbance, the CPU 7A conducts updating of the window 22 by using image signals formed by interpolation conducted in Step S35. Conversely, when it has been determined in Step S32 that there is no disturbance, updating of the window 22 is executed by using the image signal presently stored in the image memory 5A. The updating of the window is conducted in the following manner, as in the case of the known method described before. Namely, the CPU 7A makes a search through the interpolated image signals and the image signals stored in the image memory 5A to find image signals which are most closely correlated to the reference image signals stored in the reference image memory 6A, and sets a new window based upon the thus found reference image signals. It is thus possible to automatically update the tracking window 22 while suppressing the influence of the disturbance.

Second Embodiment

In the first embodiment as described, updating of the tracking window 22 is conducted on the basis of the image signals of the field which has been less affected by the disturbance. In contrast, in a second embodiment of the present invention, when the disturbance detecting device 11 has detected an occasional disturbance, the CPU 7A sets the window 22 at the same position as the previously set window 22, without conducting updating of the window 22 based upon the most current image signals which have been affected by the disturbance. In the second embodiment, updating of the window 22 is prohibited as long as disturbance is being detected by the disturbance detecting device 11. When image signals free from disturbance are detected by the disturbance detecting device, the CPU 7A commences updating of the window 22 using such image signals.

The image signals which are being picked up vary from time to time, so that there is a risk that the image signals have been largely varied during a long suspension of updating of the window 22. The arrangement therefore may be such that the tracking operation itself is suspended when the period of suspension of updating of the window 22 has exceeded a predetermined time.

In the second embodiment as described, it is possible to avoid any deviation of the window attributable to occasional disturbance, so that the same advantage is derived as that derived from the first embodiment.

In the illustrated embodiment, setting of the window is conducted manually by the driver through the manipulation of the switch 9. This, however, is only illustrative and the setting of the window may be done in various manners according to the system to which the invention is applied. For instance, it is possible to arrange that the setting of the window is performed by using a vehicle extracting filter of the type disclosed in Japanese Patent Laid-Open No. 3-45898, or on the basis of the symmetry of vehicle shape as shown in the Journal of Society of Information Processing, Vol. 127, 1986.

What is claimed is:

1. An image tracking apparatus comprising:

a) image means for forming successive images of a target to be tracked and for producing corresponding image signals based on the formed images at predetermined time intervals;

b) a first memory for storing both currently sensed image signals and previously sensed image signals produced by said imaging means;

c) window setting means for setting a tracking window on the previously sensed image signals which were stored in said first memory a predetermined time before;

d) a second memory for storing, as reference image signals, the previously sensed image signals on which said tracking window has been set by said window setting means;

e) disturbance detecting means for detecting whether or not any disturbance has been introduced into the currently sensed image signals stored in said first memory;

f) correcting means for correcting, when said disturbance detecting means has detected that the disturbance has been introduced, said currently sensed image signals stored in said first memory in such a manner as to reduce the influence of said disturbance; and g) window updating means for:
   i) updating said tracking window in accordance with a comparison between the reference image signals stored in said second memory and the currently sensed image signals stored in said first memory when said disturbance detecting means has detected that no disturbance has been introduced, and
   ii) updating said tracking window in accordance with a comparison between said reference image signals stored in said second memory and the currently sensed image signals which have been corrected by said correcting means when said disturbance detecting means has detected that a disturbance has been introduced.

2. An image tracking apparatus according to claim 1,
wherein each image frame of said image signals corresponding to said successive images produced by said imaging means includes a first field and a second field; and
wherein said disturbance detecting means detects whether a disturbance has been introduced, based upon the result of a comparison between said first and second fields of said currently sensed image signals produced by said imaging means.

3. An image tracking apparatus according to claim 2,
wherein said correcting means includes:
field detecting means for detecting one of said first and second fields of said currently sensed image signals which has been less affected by the disturbance; and
interpolation means for interpolating, using the currently sensed image signals of the field which has been detected by said field detecting means as having been less affected by the disturbance, the currently sensed image signals of the other field.

4. An image tracking apparatus comprising:
a) image means for forming successive images of a target to be tracked and for producing corresponding image signals based on the formed images at predetermined time intervals;

b) a first memory for storing both currently sensed image signals and previously sensed image signals produced by said imaging means;

c) window setting means for setting a tracking window on the previously sensed image signals which were stored in said first memory a predetermined time before;

d) a second memory for storing, as reference image signals, the previously sensed image signals on which said tracking window has been set by said window setting means;

e) window updating means for updating the tracking window in accordance with a comparison between the reference image signals stored in said second memory and the currently sensed image signals stored in said first memory;

f) disturbance detecting means for detecting whether or not any disturbance has been introduced into the currently sensed image signals stored in said first memory; and g) update prohibiting means for prohibiting the updating of said tracking window by said window updating means when the introduction of a disturbance is being detected by said disturbance detecting means.

5. An image tracking apparatus according to claim 4, further comprising: tracking suspension means for suspending the entire tracking operation when the period of prohibition of updating by said update prohibiting means has exceeded a predetermined time.

6. An image tracking apparatus according to claim 1, wherein said disturbance is an optical obstruction disposed between said target and said imaging means.

7. An image tracking apparatus according to claim 1, wherein said imaging means is disposed on a platform and said disturbance is caused by vibration of said platform.

8. An image tracking apparatus according to claim 7, wherein said platform is a vehicle.

* * * * *